United States Patent
Fletcher et al.

(10) Patent No.: US 11,117,669 B2
(45) Date of Patent: Sep. 14, 2021

(54) VANE ASSEMBLY FOR DISTRIBUTION OF A STRATIFIED FLUID IN AN AIRCRAFT

(71) Applicant: Gulfstream Aerospace Corporation, Savannah, GA (US)

(72) Inventors: Bruno Fletcher, Savannah, GA (US); Guilherme Oliveira, Savannah, GA (US); Jon Curry, Savannah, GA (US); John Bierstaker, Savannah, GA (US); Olexandr Varichev, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 188 days.

(21) Appl. No.: 16/048,959

(22) Filed: Jul. 30, 2018

(65) Prior Publication Data

US 2020/0031476 A1  Jan. 30, 2020

(51) Int. Cl.
*B64D 13/00* (2006.01)
*B64D 13/06* (2006.01)
*B64D 13/08* (2006.01)
*B64D 15/04* (2006.01)

(52) U.S. Cl.
CPC ............ *B64D 13/06* (2013.01); *B64D 13/08* (2013.01); *B64D 15/04* (2013.01); *B64D 2013/0607* (2013.01); *B64D 2013/0618* (2013.01)

(58) Field of Classification Search
CPC ........ B64D 13/06; B64D 13/08; B64D 15/04; B64D 2013/0607; B64D 2013/0618
USPC .......................................................... 454/76
See application file for complete search history.

(56) References Cited

U.S. PATENT DOCUMENTS

| | | | | |
|---|---|---|---|---|
| 5,378,265 | A | * | 1/1995 | Pearl ..................... B01D 47/18 95/219 |
| 2012/0047903 | A1 | * | 3/2012 | Williams ................ F02C 7/222 60/746 |
| 2012/0087787 | A1 | | 4/2012 | Brown |
| 2013/0175001 | A1 | * | 7/2013 | Cheong ..................... F02C 6/08 165/41 |
| 2016/0311541 | A1 | | 10/2016 | Morishita et al. |
| 2017/0122209 | A1 | | 5/2017 | Dede et al. |
| 2017/0136394 | A1 | * | 5/2017 | Zedelmair .............. F01M 13/04 |
| 2017/0159563 | A1 | * | 6/2017 | Sennoun ................ B64D 13/06 |
| 2017/0275005 | A1 | * | 9/2017 | Uefuji .................... B64D 13/06 |

FOREIGN PATENT DOCUMENTS

CA            2954449 A1    7/2017

* cited by examiner

*Primary Examiner* — Helena Kosanovic
(74) *Attorney, Agent, or Firm* — LKGlobal | Lorenz & Kopf, LLP

(57) ABSTRACT

A vane assembly for distribution of a stratified fluid in an aircraft is taught herein. The vane assembly includes a housing including a housing inlet and a housing outlet. The housing inlet is configured to receive the stratified fluid with the stratified fluid including a first portion and a second portion. The housing outlet is configured to exhaust the stratified fluid. The housing defines an interior housing volume between the housing inlet and the housing outlet. The vane assembly further includes a vane disposed within the interior housing volume and bisecting the interior housing volume. The vane includes a leading edge adjacent the housing inlet and a trailing edge adjacent the housing outlet. The trailing edge is angularly offset from the leading edge.

17 Claims, 6 Drawing Sheets

VANE ASSEMBLY FOR DISTRIBUTION OF A STRATIFIED FLUID IN AN AIRCRAFT

TECHNICAL FIELD

The present disclosure generally relates to vehicles and more particularly relates to distribution of stratified fluids in aircraft.

BACKGROUND

Aircraft typically employ an environmental control system (ECS) to pressurize a passenger cabin of the aircraft and/or thermal anti-icing systems to provide a heated air for anti-icing applications, such as wing anti-icing (WAI) systems. Air supply to these systems is typically provided by bleed air extracted from or provided by a compressor and engine bypass of an aircraft engine. To meet pressure and/or temperature demands of the various aircraft systems, hot bleed air is often extracted from a high stage or a low stage of the aircraft engine, while cold air is bled from the aircraft engine bypass.

Both low and high stage bleed air streams are mixed to a desired set point temperature leading to a heat exchanger known as the precooler; the mixed stream is at an elevated temperature. At the precooler, the hot mixed bleed air stream is cooled down by the fan air consumed from the engine bypass duct. The resulting bleed air stream which has been cooled down is then channeled through a single duct from the precooler for distribution to the WAI system and ECS. The bleed air stream leaving the precooler frequently suffers from a large temperature stratification (i.e., large cold/hot temperature variation) which if not managed can lead to a significant impact to both WAI system and ECS performance. For example, if a higher temperature portion of the bleed air stream from the precooler is directed to the ECS and a lower temperature portion of the bleed air stream from the precooler is directed to the WAI system, these systems will not operate efficiently.

Accordingly, it is desirable to provide improved distribution of a stratified fluid, such as a stratified air stream. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a vane assembly for distribution of a stratified fluid in an aircraft, a duct for distribution of a stratified fluid in an aircraft, and an aircraft including a duct for distribution of a stratified fluid, are disclosed herein.

In one non-limiting embodiment, the vane assembly includes, but is not limited to, a housing. The housing includes, but is not limited to, a housing inlet and a housing outlet. The housing inlet is configured to receive the stratified fluid. The stratified fluid includes, but is not limited to, a first portion and a second portion. The housing outlet is spaced from the housing inlet. The housing outlet is configured to exhaust the stratified fluid. The housing defines an interior housing volume between the housing inlet and the housing outlet. The vane assembly further includes, but is not limited to, a vane disposed within the interior housing volume and bisecting the interior housing volume. The vane includes, but is not limited to, a leading edge adjacent the housing inlet and a trailing edge adjacent the housing outlet. The vane has a first side and a second side opposite the first side. The first side and the second side extend between the leading edge and the trailing edge. The trailing edge is angularly offset from the leading edge relative to the first side and the second side. The first side is configured to direct the first portion between the housing inlet and the housing outlet and the second side is configured to direct the second portion between the housing inlet and the housing outlet.

In another non-limiting embodiment, the duct includes, but is not limited to, an upstream portion configured to receive the stratified fluid. The stratified fluid includes a first portion and a second portion. The duct further includes, but is not limited to, a downstream portion spaced from the upstream portion and configured to exhaust the stratified fluid. The duct further includes, but is not limited to, an interior surface disposed between the upstream portion and the downstream portion. The interior surface defines an interior duct volume between the upstream portion and the downstream portion. The duct further includes, but is not limited to, a vane disposed within and bisecting the interior duct volume. The vane includes a leading edge adjacent the upstream portion and a trailing edge adjacent the downstream portion. The vane has a first side and a second side opposite the first side. The first side and the second side extend between the leading edge and the trailing edge. The trailing edge is angularly offset from the leading edge relative to the first side and the second side. The first side is configured to direct the first portion between the upstream portion and the downstream portion and the second side is configured to direct the second portion between the upstream portion and the downstream portion.

In another non-limiting embodiment, the duct includes, but is not limited to, an upstream portion configured to receive the stratified fluid. The stratified fluid includes a first portion and a second portion. The duct further includes, but is not limited to, a downstream portion spaced from the upstream portion and configured to exhaust the stratified fluid. The duct further includes, but is not limited to, an interior surface disposed between the upstream portion and the downstream portion. The interior surface defines an interior duct volume between the upstream portion and the downstream portion. The duct further includes, but is not limited to, a vane assembly disposed within the interior duct volume. The vane assembly includes, but is not limited to, a housing including a housing inlet and a housing outlet. The housing inlet is configured to receive the stratified fluid. The housing outlet is spaced from the housing inlet and configured to exhaust the stratified fluid. The housing defines an interior housing volume between the housing inlet and the housing outlet. The vane assembly further includes, but is not limited to, a vane disposed within the interior housing volume and bisecting the interior housing volume. The vane includes, but is not limited to, a leading edge adjacent the housing inlet and a trailing edge adjacent the housing outlet. The vane has a first side and a second side opposite the first side. The first side and the second side extend between the leading edge and the trailing edge. The trailing edge is angularly offset from the leading edge relative to the first side and the second side. The first side is configured to direct the first portion between the housing inlet and the housing outlet and the second side is configured to direct the second portion between the housing inlet and the housing outlet.

BRIEF DESCRIPTION OF THE DRAWINGS

The present invention will hereinafter be described in conjunction with the following drawing figures, wherein like numerals denote like elements.

DETAILED DESCRIPTION

Figure 1:
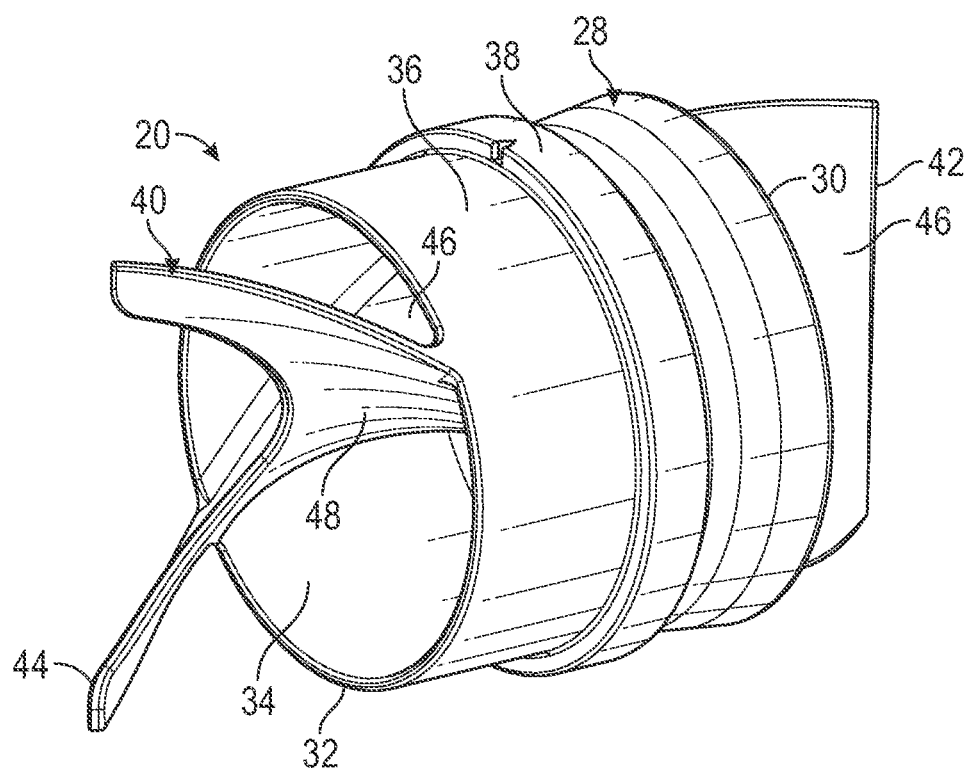
FIG. 1 is a perspective view illustrating a non-limiting embodiment of a vane assembly for distribution of a stratified fluid in an aircraft.

The following detailed description is merely exemplary in nature and is not intended to limit the systems and methods as described herein. Furthermore, there is no intention to be bound by any theory presented in the preceding background or the following detailed description.

In exemplary embodiments, a duct for distribution of a stratified fluid in an aircraft is taught herein. The duct includes an upstream portion configured to receive the stratified fluid from a precooler. The stratified fluid includes a first portion and a second portion different from the first portion. The first portion of the stratified fluid and the second portion of the stratified fluid have a temperature differential in an amount of at least about 5° C. The duct further includes a downstream portion spaced from the upstream portion and configured to exhaust the stratified fluid through a first duct outlet to a wing anti-icing (WAI) system and through a second duct outlet to an environmental control system (ECS).

The duct further includes a vane assembly disposed within the duct. The vane assembly includes a housing. The housing includes a housing inlet and a housing outlet. The vane assembly further includes a vane. The vane is disposed within the housing. The vane bisects the interior housing volume. The vane includes a leading edge adjacent the housing inlet and a trailing edge adjacent the housing outlet. The vane has a first side and a second side opposite the first side extending between the leading edge and the trailing edge. The trailing edge is angularly offset from the leading edge relative to the first side and the second side in an amount of at least about +/−135 degrees such that the vane may have a substantially helicoid configuration extending from the leading edge to the trailing edge. The first side of the vane is configured to direct the first portion of the stratified fluid between the housing inlet and the housing outlet. Further, the second side of the vane is configured to direct the second portion of the stratified fluid between the housing inlet and the housing outlet.

The first portion of the stratified fluid generated by the precooler has a lower temperature and the second portion of the stratified fluid generated by the precooler has a higher temperature. The first side of the vane may be configured to receive the first portion of the stratified fluid and exhaust the first portion to the second duct outlet. The ECS may then receive the first portion from the second duct outlet. Likewise, the second side of the vane is configured to receive the second portion of the stratified fluid and exhaust the second portion to the first duct outlet. The WAI system may then receive the second portion from the first duct outlet. To this end, the vane assembly improves distribution of the stratified fluid to components of the aircraft, namely the WAI system and the ECS thereby improving efficiency of the ECS and the WAI system. Without the vane assembly, the second portion (higher temperature) would be exhausted through the second duct outlet to the ECS and the first portion (lower temperature) would be exhausted through the first duct outlet to the WAI system thereby potentially adversely affecting efficiency of the ECS and the WAI system.

A greater understanding of the system described above may be obtained through a review of the illustrations accompanying this application together with a review of the detailed description that follows.

Figure 2:
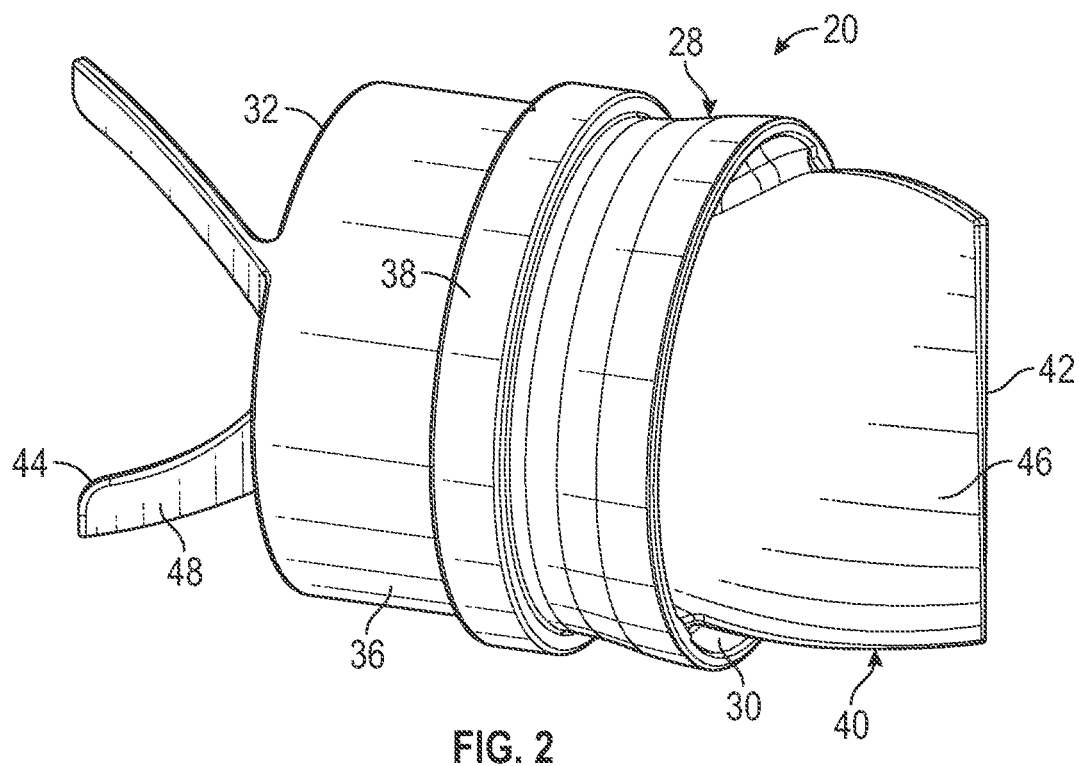
FIG. 2 is another perspective view illustrating the vane assembly of FIG. 1.
Figure 7:
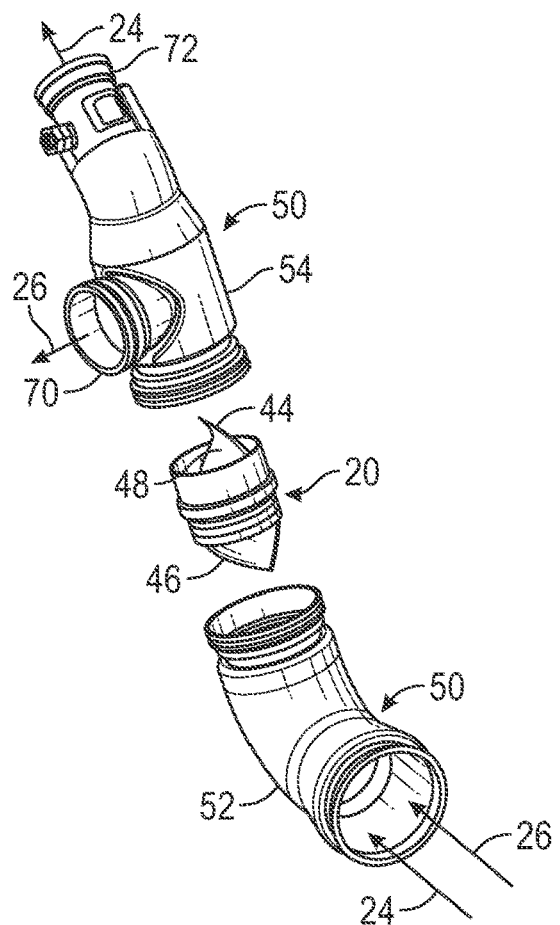
FIG. 7 is an exploded view illustrating the duct of FIG. 4 including the vane assembly of FIG. 1.
Figure 8:
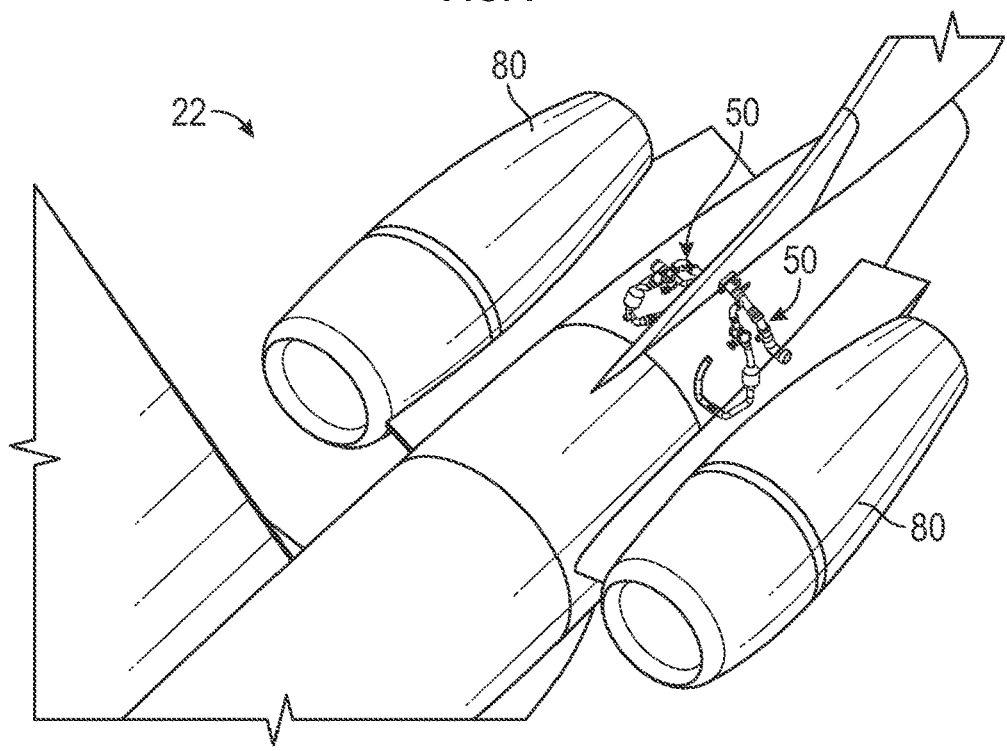
FIG. 8 is a fragmentary, transparent perspective view illustrating an aircraft including the duct of FIG. 4 for distribution of the stratified fluid.

FIGS. 1 and 2 are perspective views illustrating a non-limiting embodiment of a vane assembly 20 for distribution of a stratified fluid in an aircraft 22 (see FIG. 8). The terminology "stratified fluid" as utilized herein means the fluid includes multiple generally definable portions or zones with each portion or zone exhibiting a composition or property (such as temperature) different from the other portion(s) or zone(s). The stratified fluid includes a first portion 24 and a second portion 26 (see FIG. 7). It is to be appreciated that the stratified fluid may include greater than two zones.

With reference to FIG. 7 and continuing reference to FIGS. 1 and 2, in various embodiments, the stratified fluid includes a stratified air stream. In these embodiments, the stratified air stream includes the first portion 24 and the second portion 26 with the first portion 24 and the second portion 26 generally definable along the flow of the stratified air stream. Said differently, one side of the stratified air stream along its flow may be different than the other side of the stratified air stream. It is to be appreciated that the stratified air stream may be defined by a gradient relative to the first portion 24 and the second portion 26 (e.g., a temperature profile extending from the first portion 24 and the second portion 26). In certain embodiments, the first portion 24 of the stratified air stream and the second portion 26 of the stratified air stream have a temperature differential in an amount of at least about 5° C., alternatively at least about 30° C., or alternatively at least about 100° C. It is to be appreciated that the temperature differential is dependent on operating conditions of the components generating the stratified air stream. In certain embodiments, the temperature differential is calculated by taking the difference between the minimum and maximum temperatures of the first portion 24 and the second portion 26 (at the precooler outlet). Alternatively, the first portion 24 of the stratified air stream and the second portion 26 of the stratified air stream may have a temperature differential in an amount of from about 5 to about 150° C., alternatively from about 20 to about 140° C., or alternatively from about 30 to about 130° C. Alternatively, the temperature of the second portion 26 may differ from the temperature of the first portion 24 in an amount of at least about 5° C., alternatively at least about 30° C., or alternatively at least about 100° C.

With continuing reference to FIGS. 1 and 2, the vane assembly 20 includes a housing 28. The housing 28 includes a housing inlet 30 and a housing outlet 32. The housing inlet 30 is in fluid communication with the housing outlet 32. The housing inlet 30 is configured to receive the stratified fluid. The housing outlet 32 is spaced from the housing inlet 30 and configured to exhaust the stratified fluid. The housing 28 defines an interior housing volume 34 between the housing inlet 30 and the housing outlet 32. The housing 28 may have a substantially cylindrical configuration. The terminology "substantially" as utilized herein with reference to cylindrical means that a cross section of the housing 28 has a generally elliptical configuration. In certain embodiments, the housing 28 has an exterior surface 36 opposite the interior housing volume 34 and includes a shoulder 38 extending about the exterior surface 36. In various non-limiting embodiments, the housing 28 comprises a material configured to withstand the temperature differential without substantial deformation.

Figure 3:
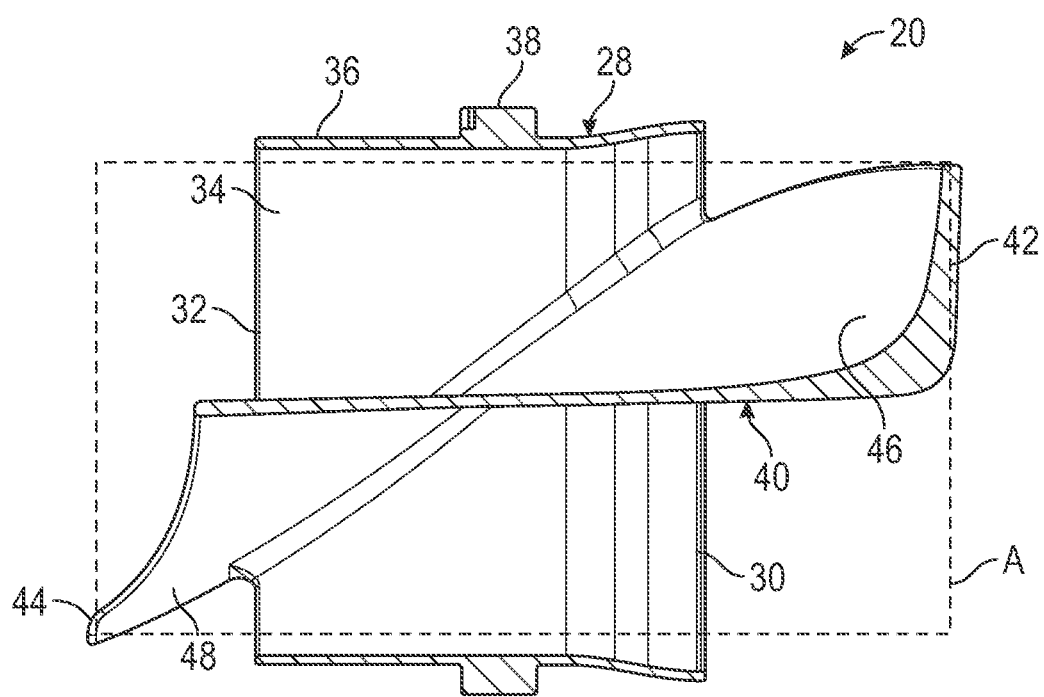
FIG. 3 is a cut-away perspective view illustrating the vane assembly of FIG. 1.

FIG. 3 is a cut-away perspective view illustrating the vane assembly 20 of FIG. 1. The vane assembly 20 further includes a vane 40. The vane 40 is disposed within the interior housing volume 34. It is to be appreciated that the vane 40 may extend beyond the interior housing volume 34 so long as a portion of the vane 40 is disposed within the interior housing volume 34. In certain embodiments, the vane 40 extends beyond the interior housing volume 34. The vane 40 bisects the interior housing volume 34. It is to be appreciated that the vane 40 may only partially bisect the interior housing volume 34 while still being considered to bisect the interior housing volume 34. In certain embodiments, the vane 40 completely bisects the interior housing volume 34 between the housing inlet 30 and the housing outlet 32. In a non-limiting embodiment, the vane inhibits the first portion and the second potion from mixing.

With continuing reference to FIGS. 1, 2, and 3, the vane 40 includes a leading edge 42 adjacent the housing inlet 30 and a trailing edge 44 adjacent the housing outlet 32. The vane 40 has a first side 46 and a second side 48 opposite the first side 46 extending between the leading edge 42 and the trailing edge 44. The leading edge 42 may have a substantially linear configuration. The trailing edge 44 may have a generally U-shaped configuration defining a recess extending through the first side 46 and the second side 48. The trailing edge 44 is angularly offset from the leading edge 42 relative to the first side 46 and the second side 48. The phrase "relative to the first side 46 and the second side 48" means that the leading edge 42 and the trailing edge 44 are defined by the first side 46 and the second side 48 such that even if the trailing edge 44 is angularly offset from the leading edge 42 by 180 degrees, thus appearing in line to each other, the trailing edge 44 is still angularly offset from the leading edge 42 because the angular offset is relative to the first side 46 and the second side 48. In certain embodiments, the leading edge 42 of the vane 40 defines a plane A extending from the leading edge 42 to the trailing edge 44. In these embodiments, the trailing edge 44 may be angularly offset from the leading edge 42 in an amount of at least about +/−10 degrees, at least about +/−90 degrees, or at least about +/−135 degrees, relative to the plane A. In exemplary embodiments, the vane 40 has a substantially helicoid configuration extending from the leading edge 42 to the trailing edge 44 with the trailing edge 44 angularly offset from the leading edge 42 in an amount of at least about +/−135 degrees. In these embodiments, the first side 46 and the second side 48 change orientation relative to the plane A as the first side 46 and the second side 48 extend from the leading edge 42 to the trailing edge 44. It is to be appreciated that the angular offsets described immediately above are relevant to certain designs and may vary depending on duct configuration (described below), duct outlet placement (described below), stratification orientation of the fluid, etc.

With continuing reference to FIGS. 1, 2, 3, and 7, the first side 46 of the vane 40 is configured to direct the first portion 24 of the stratified fluid between the housing inlet 30 and the housing outlet 32. Further, the second side 48 of the vane 40 is configured to direct the second portion 26 of the stratified fluid between the housing inlet 30 and the housing outlet 32. In certain embodiments when the vane 40 has the substantially helicoid configuration, the first portion 24 of the stratified fluid is directed by the first side 46 to change orientation relative to the plane A as the first portion 24 moves from the leading edge 42 to the trailing edge 44. Likewise, in certain embodiments when the vane 40 has the substantially helicoid configuration, the second portion 26 of the stratified fluid is directed by the second side 48 to change orientation relative to the plane A as the second portion 26 moves from the leading edge 42 to the trailing edge 44. Such a change in orientation of the stratified fluid by the vane 40 may be desirable to optimize distribution of the first portion 24 and the second portion 26 of the stratified fluid.

Figure 4:
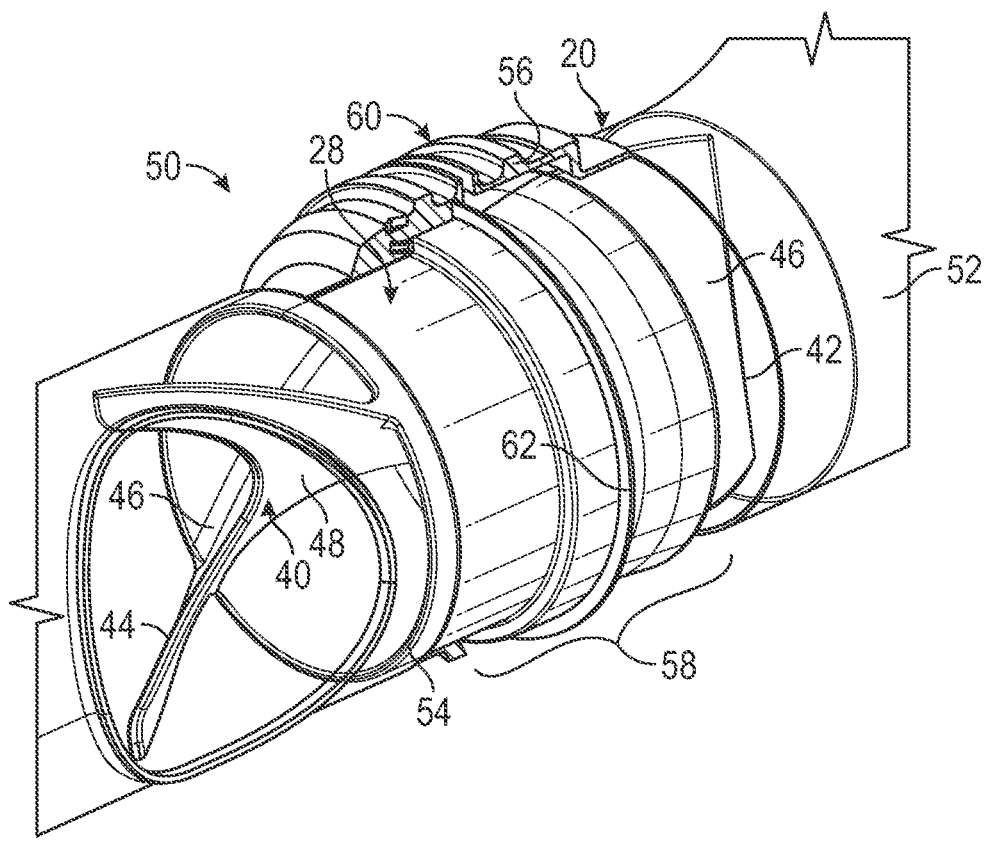
FIG. 4 is a fragmentary, transparent perspective view illustrating a duct for distribution of a stratified fluid in an aircraft.

FIG. 4 is a fragmentary, transparent perspective view illustrating a duct 50 for distribution of the stratified fluid in the aircraft 22. The duct 50 includes an upstream portion 52 configured to receive the stratified fluid and, as described above, the stratified fluid includes the first portion 24 and the second portion 26. The duct 50 further includes a downstream portion 54 spaced from the upstream portion 52 and configured to exhaust the stratified fluid. The duct 50 further includes an interior surface 56 disposed between the upstream portion 52 and the downstream portion 54, and the interior surface 56 defining an interior duct volume 58 between the upstream portion 52 and the downstream portion 54. In various non-limiting embodiments, the duct 50 comprises a material configured to withstand the temperature differential without substantial deformation.

The vane 40, as described above, is disposed within, and bisects, the interior duct volume 58. The vane 40 includes the leading edge 42 adjacent the upstream portion 52 and the trailing edge 44 adjacent the downstream portion 54. The vane 40 has the first side 46 and the second side 48 opposite the first side 46. The first side 46 and the second side 48 extend between the leading edge 42 and the trailing edge 44. The trailing edge 44 is angularly offset from the leading edge 42 relative to the first side 46 and the second side 48. The first side 46 is configured to direct the first portion 24 of the stratified fluid between the upstream portion 52 and the downstream portion 54 and the second side 48 is configured to direct the second portion 26 of the stratified fluid between the upstream portion 52 and the downstream portion 54.

In certain embodiments, the duct 50 includes the vane assembly 20 as described above rather than merely only including the vane 40. The vane assembly 20 may be disposed within the interior duct volume 58. The vane assembly 20 may include the housing 28 and the vane 40. The housing 28 may include the housing inlet 30 and the housing outlet 32. The housing inlet 30 may be configured to receive the stratified fluid. The housing outlet 32 may be spaced from the housing inlet 30 and configured to exhaust the stratified fluid. The housing 28 may define the interior housing volume 34 between the housing inlet 30 and the housing outlet 32. The vane 40 may be disposed within the interior housing volume 34 and may bisect the interior housing volume 34.

In various embodiments, the duct 50 includes a sleeve 60 configured to support the vane assembly 20. The sleeve 60 may be disposed between and coupled to the upstream portion 52 of the duct 50 and the downstream portion 54 of the duct 50 for coupling the upstream portion 52 and the downstream portion 54 together.

Figure 5:
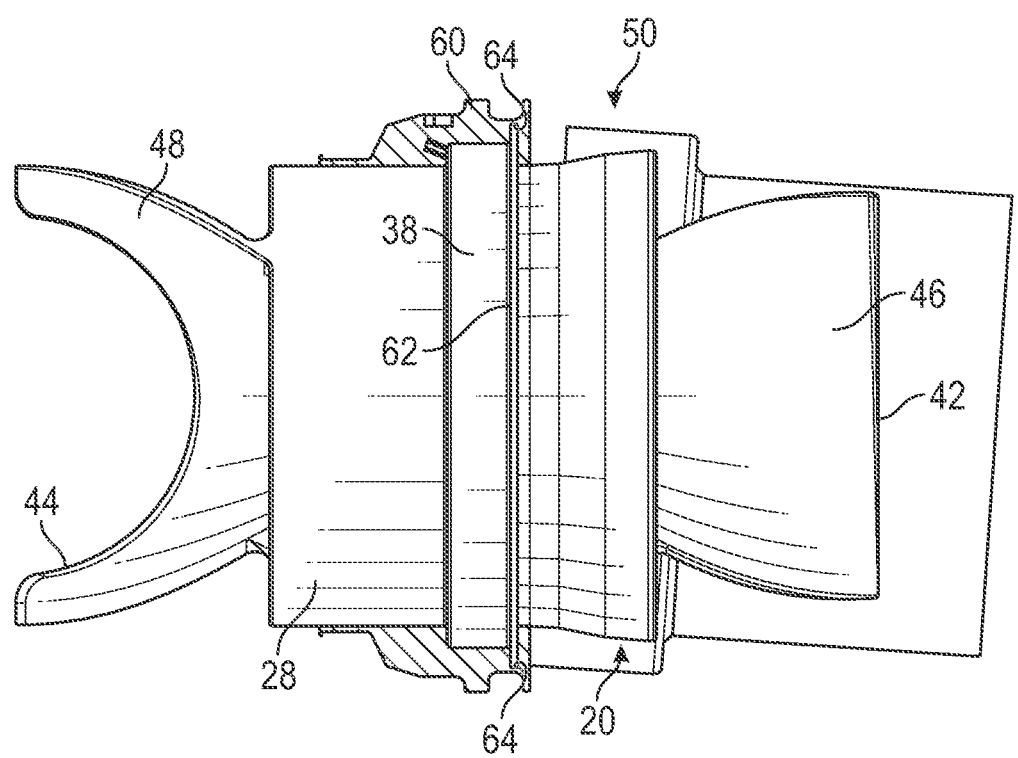
FIG. 5 is a cut-away perspective view illustrating a duct including a locking ring and the vane assembly of FIG. 1.

FIG. 5 is a cut-away perspective view illustrating the duct 50 including a locking ring 62 and the vane assembly 20 of FIG. 1. The duct 50 may further include a locking ring 62 configured to abut the shoulder 38 of the housing 28. The interior surface 56 of the duct 50 defines a groove 64 adjacent the shoulder 38. In embodiments when the duct 50 includes the sleeve 60, the sleeve 60 may define the groove 64. The groove 64 is configured to receive the locking ring 62 to minimize lateral movement of the vane assembly 20 within the duct 50.

Figure 6:
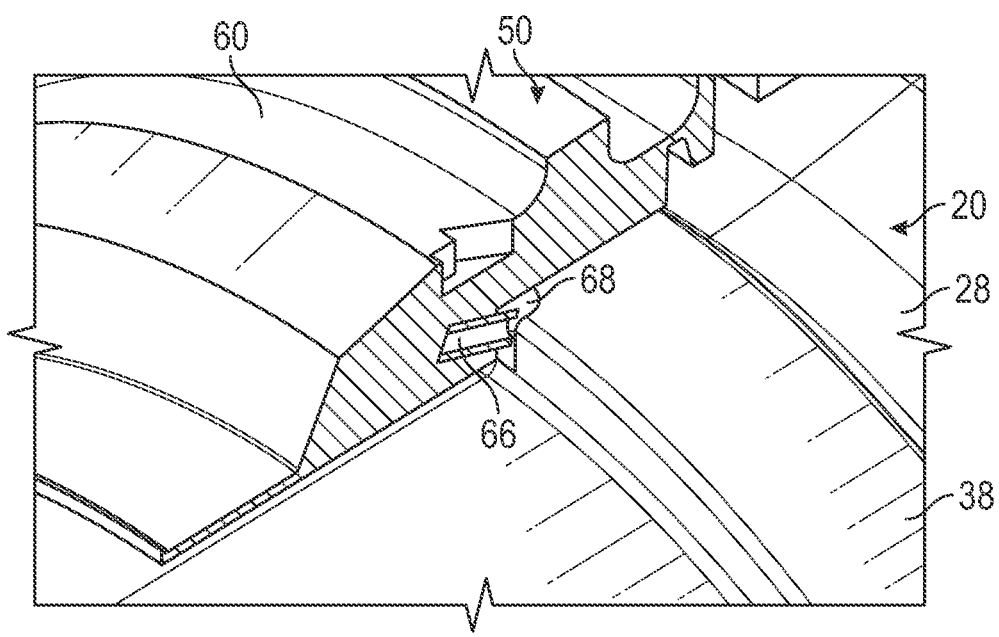
FIG. 6 is a cut-away perspective view illustrating a duct including a pin and the vane assembly of FIG. 1.

FIG. 6 is a cut-away perspective view illustrating the duct 50 including a pin 66 and the vane assembly 20 of FIG. 1. The duct 50 may further include the pin 66 extending into the interior housing volume 34. In embodiments when the duct 50 includes the sleeve 60, the sleeve 60 may include the pin 66. The shoulder 38 of the housing 28 may define a notch 68. The notch 68 may be configured to receive the pin 66 to minimize rotational movement of the vane assembly 20 within the duct 50.

FIG. 7 is an exploded view illustrating the duct 50 of FIG. 4 including the vane assembly 20 of FIG. 1. The duct 50 further includes a first duct outlet 70 and a second duct outlet 72. The first duct outlet 70 and the second duct outlet 72 are in fluid communication with the downstream portion 54 of the duct 50. The second side 48 of the vane 40 adjacent the trailing edge 44 may face the first duct outlet 70. The first side 46 of the vane 40 adjacent the trailing edge 44 may face the second duct outlet 72. In certain embodiments, the first side 46 of the vane 40 is configured to receive the first portion 24 of the stratified fluid and exhaust the first portion 24 to the second duct outlet 72. Likewise, in certain embodiments, the second side 48 of the vane 40 is configured to receive the second portion 26 of the stratified fluid and exhaust the second portion 26 to the first duct outlet 70.

FIG. 8 is a fragmentary, transparent perspective view illustrating the aircraft 22 including the duct 50 of FIG. 4 for distribution of the stratified fluid. The duct 50, as described above, includes the vane assembly 20 (not shown). The upstream portion 52 (not shown) of the duct 50 may receive the stratified fluid from the various components of the aircraft 22 including, but not limited to, a second duct outlet 72 (see FIG. 9). It is to be appreciated that other components of the aircraft 22 can generate the stratified fluid, such as where compact cross-flow heat exchangers are utilized (for instance, in the ram air circuit). The downstream portion 54 (not shown) of the duct 50 may exhaust the stratified fluid to various components of the aircraft 22 including, but not limited to, an environmental control system (ECS) 76 and a wing anti-icing (WAI) system 78 (see FIG. 9). It is to be appreciated that other components of the aircraft 22 can utilize the stratified fluid.

Figure 9:
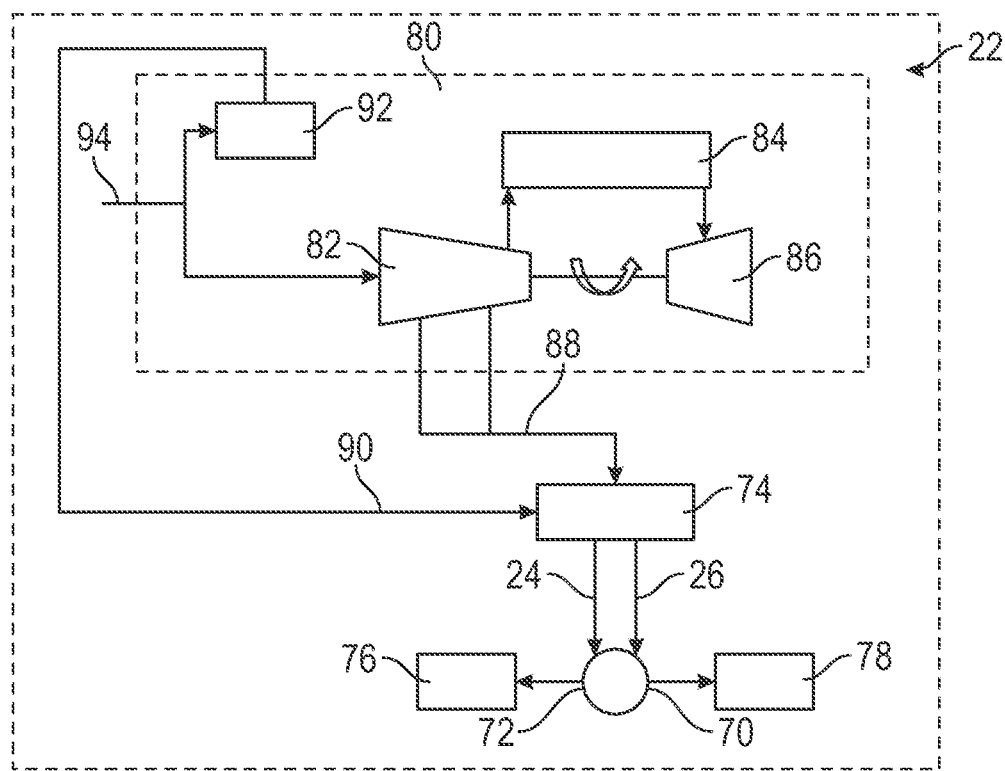
FIG. 9 is a schematic view illustrating the aircraft of FIG. 8.

FIG. 9 is a schematic view illustrating the aircraft 22 of FIG. 8. With reference to FIG. 9 and continuing reference to FIG. 7, in certain embodiments, the aircraft 22 includes the precooler 74 with the precooler 74 in fluid communication with the upstream portion 52 of the duct 50. The precooler 74 may be configured to generate the stratified fluid. The aircraft 22 may further include the WAI system 78 and the ECS 76 with the WAI system 78 in fluid communication with the first duct outlet 70 and the ECS 76 in fluid communication with the second duct outlet 72.

In exemplary embodiments, the first portion 24 of the stratified fluid generated by the precooler 74 has a lower temperature and the second portion 26 of the stratified fluid generated by the precooler 74 has a higher temperature. The first side 46 of the vane 40 may be configured to receive the first portion 24 of the stratified fluid and exhaust the first portion 24 to the second duct outlet 72. The ECS 76 may then receive the first portion 24 from the second duct outlet 72. Likewise, the second side 48 of the vane 40 is configured to receive the second portion 26 of the stratified fluid and exhaust the second portion 26 to the first duct outlet 70. The WAI system 78 may then receive the second portion 26 from the first duct outlet 70. To this end, the vane assembly 20 improves distribution of the stratified fluid to components of the aircraft 22, namely the WAI system 78 and the ECS 76 thereby improving efficiency of the ECS 76 and the WAI system 78. Without the vane assembly 20, the second portion 26 (higher temperature) would be exhausted through the second duct outlet 72 to the ECS 76 and the first portion 24 (lower temperature) would be exhausted through the first duct outlet 70 to the WAI system 78 thereby potentially adversely affecting efficiency of the ECS 76 and the WAI system 78.

In various embodiments, the aircraft 22 includes an aircraft engine 80 including a compressor 82, a bypass 92, a combustor 84, and a turbine 86. The compressor 82 and the bypass 92 may receive air 94 from the environment. The compressor 82 may include a high stage and a low stage and may generate a higher temperature air stream 88 from the high stage, the low stage, or a combination thereof. In embodiments including the higher temperature air stream 88 from both the high stage and the low stage, the air stream from the high stage and the air stream from the low stage may be combined and mixed to form the higher temperature air stream 88. The bypass 92 may generate a lower temperature air stream 90. Both of the higher temperature air stream 88 and the lower temperature air stream 90 are independently channeled to the precooler 74 thereby resulting in the generation of the stratified fluid by the precooler 74.

Figure 10A:
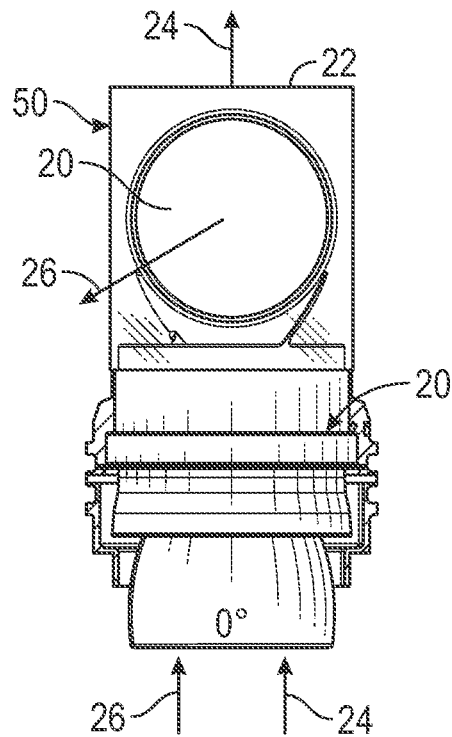
FIGS. 10A, 10B, and 10C are schematic views illustrating the duct of FIG. 4 including the vane assembly of FIG. 1 with the vane assembly arranged in three different orientations.
Figure 10B:
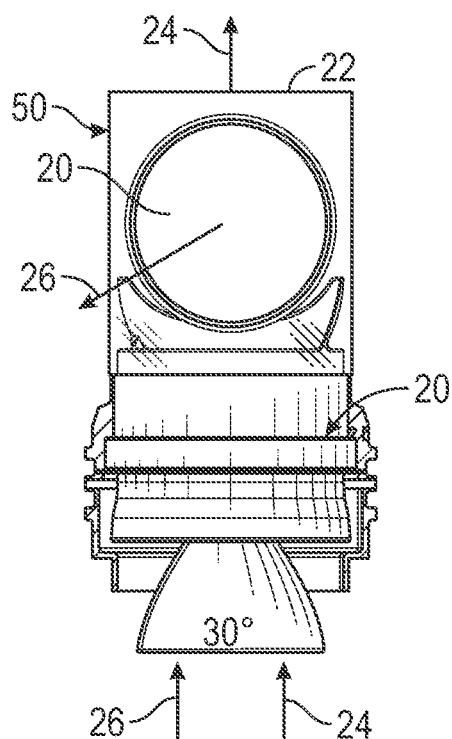
Figure 10C:
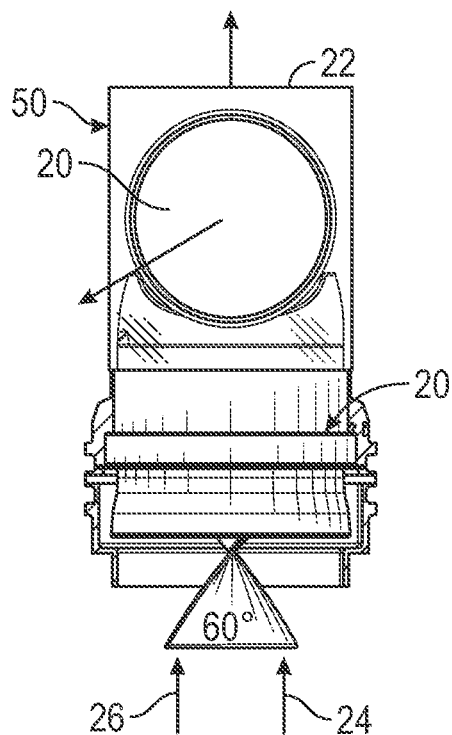

FIGS. 10A, 10B, and 10C are schematic views illustrating the duct 50 of FIG. 4 including the vane assembly 20 of FIG. 1 with the vane assembly 20 arranged in three different orientations. With continuing reference to FIG. 4, the vane assembly 20 may be rotated relative to the duct 50 to adjust distribution of the stratified fluid. For example, as shown in FIG. 10A, the vane assembly 20 may be aligned at a reference position (0°) wherein the second side 48 of the vane 40 adjacent the trailing edge 44 of the vane 40 faces the first duct outlet 70 and the first side 46 of the vane 40 adjacent the trailing edge 44 of the vane 40 faces the second duct outlet 72. In this reference position (0°), the fluid flow may be generally equal between the first duct outlet 70 and the second duct outlet 72 and the fluid may remain stratified between the first duct outlet 70 and the second duct outlet 72. As shown in FIG. 10B, rotation of the vane assembly 20 by 30° relative to the reference position may result in a fluid flow that is biased towards the first duct outlet 70 and the fluid may remain stratified between the first duct outlet 70 and the second duct outlet 72. As shown in FIG. 10C, rotation of the vane assembly 20 by 60° relative to the reference position may result in a fluid flow that is generally equal between the first duct outlet 70 and the second duct outlet 72, but the fluid may no longer be stratified between the first duct outlet 70 and the second duct outlet 72 (i.e. the fluid is mixed). It is to be appreciated that the angles of rotation described immediately above are relevant to certain designs and may vary depending on duct configuration, duct outlet placement, stratification orientation of the fluid, angular offset of vane, etc.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A vane assembly for distribution of a stratified fluid in an aircraft, the stratified fluid having a first portion and a second portion, the vane assembly comprising:
   a housing comprising a housing inlet and a housing outlet, the housing inlet configured to receive the stratified fluid, the housing outlet spaced from the housing inlet and configured to exhaust the stratified fluid, and the housing defining an interior housing volume between the housing inlet and the housing outlet; and
   a vane disposed within and extending through the housing and bisecting the interior housing volume into a first passageway and a second passageway separate from the first passageway, the vane comprising a leading edge extending from the housing inlet in an upstream direction and a trailing edge extending from the housing outlet in a downstream direction, the vane having a first side and a second side opposite the first side, the first side and the second side extending between the leading edge and the trailing edge, and the trailing edge angularly offset from the leading edge relative to the first side and the second side;
   wherein the first side is configured to separate and direct the first portion between the housing inlet and the housing outlet through the first passageway and the second side is configured to separate and direct the second portion between the housing inlet and the housing outlet through the second passageway without mixing with the first portion.

2. The vane assembly of claim 1, wherein the leading edge of the vane defines a plane extending from the leading edge to the trailing edge, and the trailing edge is angularly offset from the leading edge in an amount of at least about +/−10 degrees relative to the plane.

3. The vane assembly of claim 1, wherein the vane has a substantially helicoid configuration extending from the leading edge of the vane to the trailing edge of the vane.

4. The vane assembly of claim 1, wherein the leading edge has a substantially linear configuration.

5. The vane assembly of claim 1, wherein the trailing edge has a generally U-shaped configuration defining a recess.

6. The vane assembly of claim 1, wherein the housing has a substantially cylindrical configuration.

7. The vane assembly of claim 1, wherein the stratified fluid comprises a stratified air stream and the first portion of the stratified air stream and the second portion of the stratified air stream have a temperature differential in an amount of at least 5° C.

8. A duct for distribution of a stratified fluid in an aircraft, the stratified fluid having a first portion and a second portion, the duct comprising:
   an upstream portion configured to receive the stratified fluid;
   a downstream portion spaced from the upstream portion and having a first duct outlet and a second duct outlet separate from the first duct outlet, wherein the first duct outlet is configured to exhaust the first portion of the stratified fluid and the second duct outlet is configured to exhaust the second portion of the stratified fluid;
   an interior surface disposed between the upstream portion and the downstream portion, and the interior surface defining an interior duct volume between the upstream portion and the downstream portion; and
   a vane extending through the inner surface and bisecting the interior duct volume into a first passageway and a second passageway separate from the first passageway, the vane comprising a leading edge extending into the upstream portion and a trailing edge extending into the downstream portion, the vane having a first side and a second side opposite the first side, the first side and the second side extending between the leading edge and the trailing edge, and the trailing edge angularly offset from the leading edge relative to the first side and the second side;
   wherein the first side is configured to separate and direct the first portion through the first passageway from the upstream portion and through the first duct outlet in the downstream portion and the second side is configured to separate and direct the second portion through the second passageway from the upstream portion and through the second duct outlet in the downstream portion without mixing with the first portion.

9. The duct of claim 8, wherein the duct further comprises a vane assembly disposed within the interior duct volume, the vane assembly comprises a housing and the vane, the housing comprises a housing inlet and a housing outlet, the housing inlet is configured to receive the stratified fluid, the housing outlet is spaced from the housing inlet and configured to exhaust the stratified fluid, the housing defines an interior housing volume between the housing inlet and the housing outlet, and wherein the vane is disposed within the interior housing volume and bisecting the interior housing volume.

10. The duct of claim 9, wherein the housing has an exterior surface opposite the interior housing volume and comprises a shoulder extending about the exterior surface.

11. The duct of claim 10, wherein the duct further comprises a locking ring configured to abut the shoulder of the housing, the interior surface of the duct defines a groove adjacent the shoulder, and the groove is configured to receive the locking ring to minimize lateral movement of the vane assembly within the duct.

12. The duct of claim 10, wherein the duct further comprises a pin extending into the interior housing volume, the shoulder of the housing defines a notch, and the notch is configured to receive the pin to minimize rotational movement of the vane assembly within the duct.

13. The duct of claim 8, wherein the duct comprises a sleeve configured to support the vane assembly, the sleeve disposed between and coupled to the upstream portion of the duct and the downstream portion of the duct for coupling the upstream portion and the downstream portion together.

14. An aircraft comprising:
   a duct for distribution of a stratified fluid having a first portion and a second portion, the duct comprising:

an upstream portion configured to receive the stratified fluid;

a downstream portion spaced from the upstream portion and having a first duct outlet and a second duct outlet separate from the first duct outlet, wherein the first duct outlet is configured to exhaust the first portion of the stratified fluid and the second duct outlet is configured to exhaust the second portion of the stratified fluid;

an interior surface disposed between the upstream portion and the downstream portion, and the interior surface defining an interior duct volume between the upstream portion and the downstream portion; and a vane assembly disposed within the interior duct volume, the vane assembly comprising;

a housing comprising a housing inlet and a housing outlet, the housing inlet configured to receive the stratified fluid, the housing outlet spaced from the housing inlet and configured to exhaust the stratified fluid, and the housing defining an interior housing volume between the housing inlet and the housing outlet, and a vane disposed within and extending through the housing and bisecting the interior housing volume into a first passageway and a second passageway separate from the first passageway, the vane comprising a leading edge extending from the housing inlet and into the upstream portion in an upstream direction and a trailing edge extending from the housing outlet and into the downstream portion in a downstream direction, the vane having a first side and a second side opposite the first side, the first side and the second side extending between the leading edge and the trailing edge, and the trailing edge angularly offset from the leading edge relative to the first side and the second side, wherein the first side is configured to separate and direct the first portion through the first passageway from the housing inlet through the housing outlet to the first duct outlet and the second side is configured to separate and direct the second portion through the second passageway from the housing inlet through the housing outlet to the second duct outlet without mixing with the first portion.

15. The aircraft of claim 14 further comprising a precooler, wherein the precooler is in fluid communication with the upstream portion of the duct and is configured to generate the stratified fluid.

16. The aircraft of claim 14 further comprising wing anti-icing system in fluid communication with the first duct outlet and an environmental control system in fluid communication with the second duct outlet.

17. The aircraft of claim 14, wherein the stratified fluid comprises a stratified air stream and the first portion of the stratified air stream and the second portion of the stratified air stream have a temperature differential in an amount of at least 5° C., and wherein the duct and the housing comprise a material configured to withstand the temperature differential without substantial deformation.

\* \* \* \* \*